United States Patent [19]

Erlandsen

[11] 4,425,723
[45] Jan. 17, 1984

[54] CLAM DREDGE

[76] Inventor: Peter Erlandsen, 122 E. Myrtle Rd., Wildwood Crest, N.J. 08260

[21] Appl. No.: 461,856

[22] Filed: Jan. 28, 1983

[51] Int. Cl.³ .......................... E02F 5/00; A01K 75/00
[52] U.S. Cl. .......................................... 37/55; 37/119; 171/107; 172/393; 172/688
[58] Field of Search ................... 37/55, 119, 54, 71, 37/DIG. 8; 172/390, 393, 687, 688; 171/63, 107, 105, 106; 299/8, 9

[56] References Cited

U.S. PATENT DOCUMENTS

| 27,213 | 2/1860 | Force | 37/119 |
|---|---|---|---|
| 279,373 | 6/1883 | Friend | 37/119 |
| 381,835 | 4/1888 | Gorsuch | 172/688 X |
| 494,614 | 4/1893 | Wyman | 172/688 X |
| 1,323,122 | 11/1919 | Taylor | 37/119 |
| 2,307,436 | 1/1943 | Wadelton et al. | 172/390 |
| 3,126,865 | 3/1964 | Wiegardt, Jr. | 37/55 X |
| 3,226,854 | 1/1966 | Mero | 37/55 X |

FOREIGN PATENT DOCUMENTS 141355  5/1950  Australia ............................. 37/119

Primary Examiner—Clifford D. Crowder
Attorney, Agent, or Firm—Duffield & Lehrer

[57] ABSTRACT

A shellfish dredge includes a pair of longitudinally extending parallel and spaced apart runners having a collecting bag mounted adjacent the rear thereof. The runners support a frame comprising a pair of longitudinally extending spaced apart skids and at least two crossbars connecting the skids together. Secured to each crossbar and extending forwardly and downwardly therefrom at an acute angle are a plurality of tines thereby forming at least two parallel rows of parallel arranged tines. The skids extend downwardly beneath the bottom of the runners and are tapered at their forward ends so that the frame and tines will be cammed upwardly should the skids encounter an obstruction. Springs located between the runners and the skids bias the skids downwardly but allow for limited vertical movement between the runners and the skids.

5 Claims, 6 Drawing Figures

CLAM DREDGE

BACKGROUND OF THE INVENTION

The present invention is directed toward a shellfish dredge and more particularly toward a dredge for harvesting surf clams, quohogs and the like.

Apparatus which is presently in use for collecting clams or other shellfish from the bottom of the sea includes a dredge having a knife adjacent the forward end thereof which is adapted to cut through the sand at the bottom of the sea. Located in front of the knife are a plurality of nozzles which inject water under a pressure of approximately 125 pounds into the sand to soften the ocean bottom before the knife cuts therethrough. In order to provide such water pressure, pumps must be carried by the ship and long hoses having diameters of between 6 and 10 inches must be connected between the dredge and the ship.

The use of this high pressure water forces a great deal of sand into the clams. As a result, the majority of the clams which go under the knife and are not picked up by the dredge are destroyed by the sand forced into them thereby destroying the clam bed. Furthermore, even those clams which are harvested have a great deal of sand in them. This causes particular problems for the undersized clams which are brought up onto the deck of the ship by the dredge and which must be thrown back into the ocean since only clams of 5 inches or larger can be harvested. The smaller clams, being full of sand, normally will die. It is estimated that only about 25 percent of available clams are harvested and the remainder which could be harvested die from being smothered.

There have been proposals in the past for seafood dredges which do not utilize high pressure water. All of these devices generally include a single row of downwardly depending teeth located in front of a collection bag or cage. Examples of such devices are shown in U.S. Pat. Nos. 1,413,944; 3,608,217 and 4,112,602.

To applicant's knowledge, none of these proposed devices have ever been successfully commercialized. With a single row of teeth, the teeth must be relatively close together in order to pick up the clams or other shellfish. However, this makes it substantially more difficult to pull the dredge through the sand since clam beds are normally quite compact and must be broken up by the teeth. Furthermore, these prior devices have not provided efficient means for preventing damage to the teeth in the event that the dredge encounters a rock bed or the like. This is due to the fact that the bottom of the teeth are the lowermost part of the dredge and are, therefore, the first to encounter rocks or similar obstructions.

SUMMARY OF THE INVENTION

The present invention is designed to overcome all of the deficiencies of the prior art devices described above. It is capable of harvesting clams or other shellfish without destroying the clams left behind and is also designed to be substantially maintanance free. This is accomplished, according to the present invention, by a dredge including a pair of longitudinally extending parallel and spaced apart runners having a collecting bag mounted adjacent the rear thereof. The runners support a frame comprising a pair of longitudinally extending spaced apart skids and at least two crossbars connecting the skids together. Secured to each crossbar and extending forwardly and downwardly therefrom at an acute angle are a plurality of tines thereby forming at least two parallel rows of parallel arranged tines. The skids extend downwardly beneath the bottom of the runners and are tapered at their forward ends so that the frame and tines will be cammed upwardly should the skids encounter an obstruction. Springs located between the runners and the skids bias the skids downwardly but allow for limited vertical movement between the runners and the skids.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
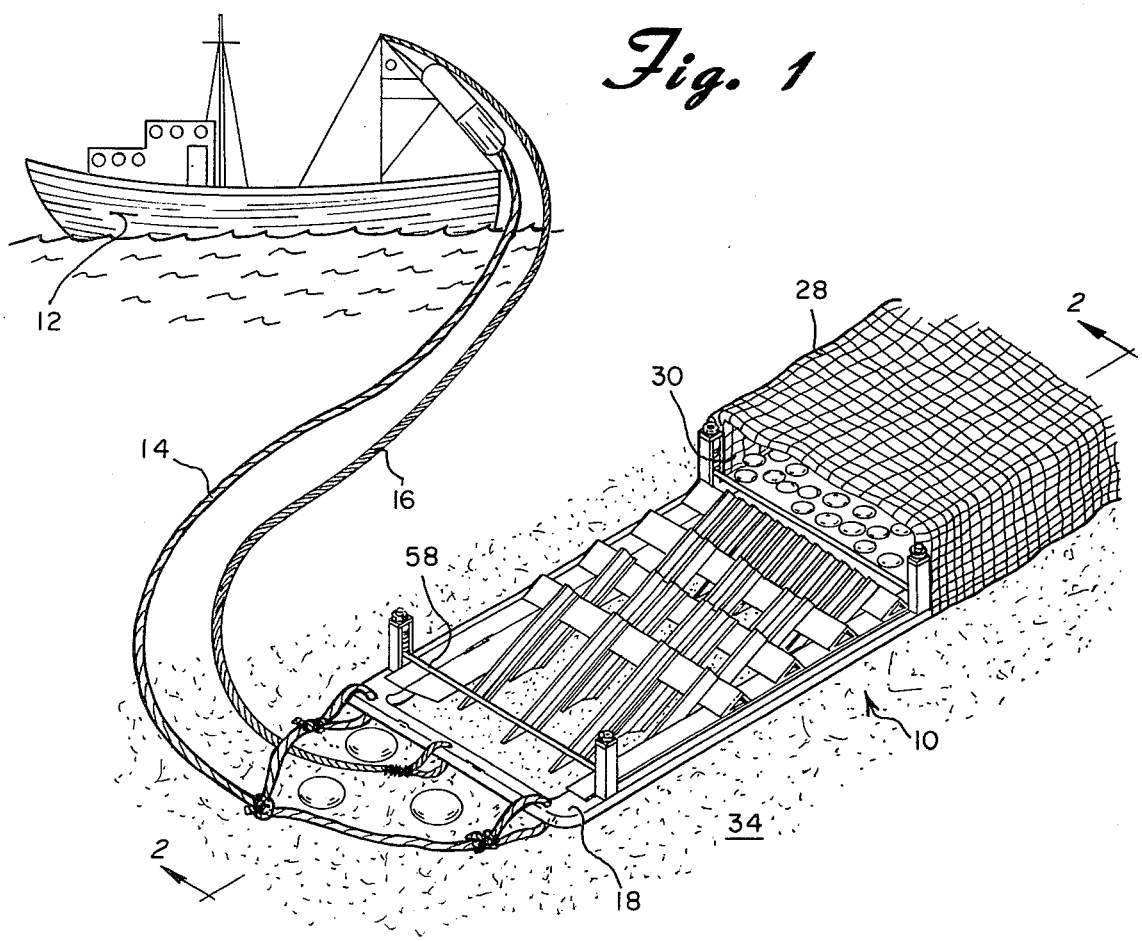
FIG. 1 is a front and top perspective view of a clam dredge constructed in accordance with the principles of the present invention and diagrammatically shown as being pulled by a ship.

Referring now to the drawings in detail wherein like reference numerals have been used throughout the various figures to designate like elements, there is shown in FIG. 1 a clam dredge constructed in accordance with the principles of the present invention and designated generally at 10. Dredge 10 is shown connected to the rear of a ship 12 by a towline 14 and a lifting line 16. The lines 14 and 16 are connected to the forwardmost end 18 of the dredge 10. The manner in which the dredge 10 of the present invention is moved across the ocean floor by the ship 12 and the manner in which it is lifted onto the ship are conventional. Accordingly, the details of the same will not be discussed herein.

The dredge 10 is comprised essentially of a pair of elongated longitudinally extending parallel spaced apart runners 20 and 22. These runners 20 and 22 are ski-like devices having smooth flat lower surfaces and are curved upwardly at the forward ends thereof as shown most clearly at 24 in FIG. 5. The forwardmost ends of the runners 20 and 22 are joined together by front connecting bar 26. Although not specifically shown in the drawings, a similar connecting bar also joins the rearwardmost ends of the runners together.

A bag or cage 28 is mounted on the rear portion of the runners 20 and 22. The bag 28 serves to collect the clams or other shellfish scooped up by the forward portion of the dredge 10 which will be explained in more detail hereinafter. For this purpose, the bag which is comprised of a suitable netting or chain mesh material is totally enclosed except for the forward opening 30 which allows the clams 32 to enter.

In order to harvest the clams or other shellfish from the beds on the ocean floor, the forward portion of the runners 20 and 22, that is, the portion between the bag 28 and the front connecting bar 26, carries a plurality of rows of downwardly and forwardly projecting teeth or tines which will be described more fully hereinafter. To this end, a frame is provided which consists of a pair of spaced apart and longitudinally extending skid members 36 and 38. As shown most clearly in FIG. 3, each of the skid members 36 and 38 includes a horizontally disposed portion 40 and 42, respectively, and a vertically disposed portion. Only the vertically disposed portion 44 of the skid 38 is shown in the drawings. It being understood that a similar vertically disposed portion is provided on the skid 36.

Figure 3:
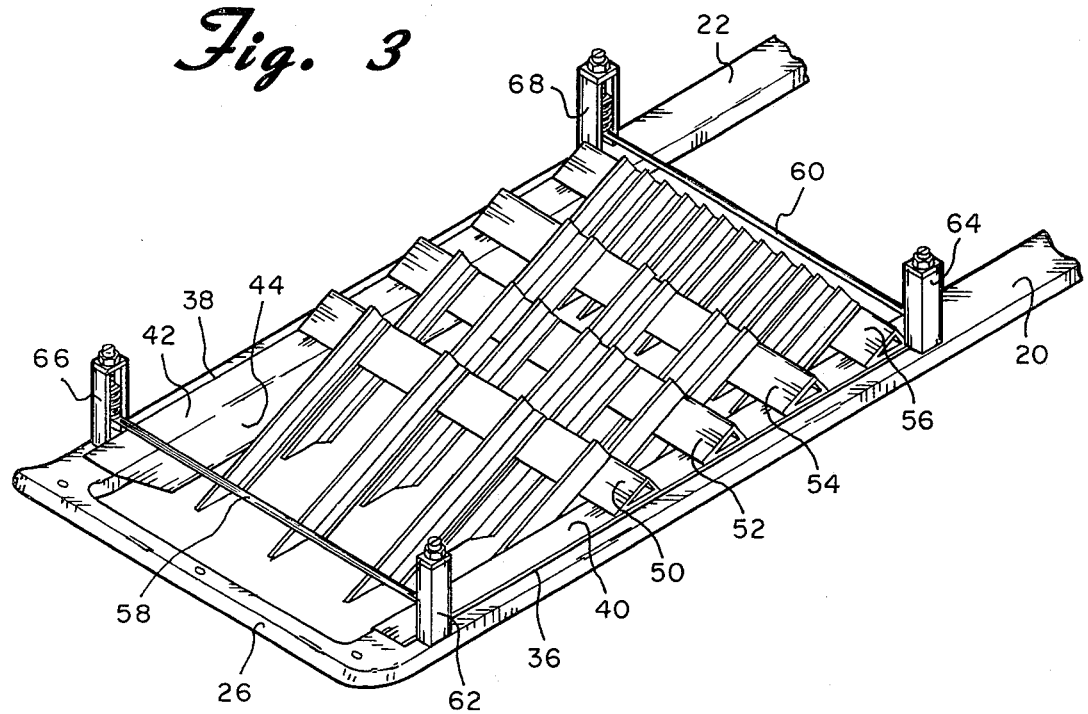
FIG. 3 is a perspective view similar to FIG. 1 but slightly enlarged.
Figure 4:
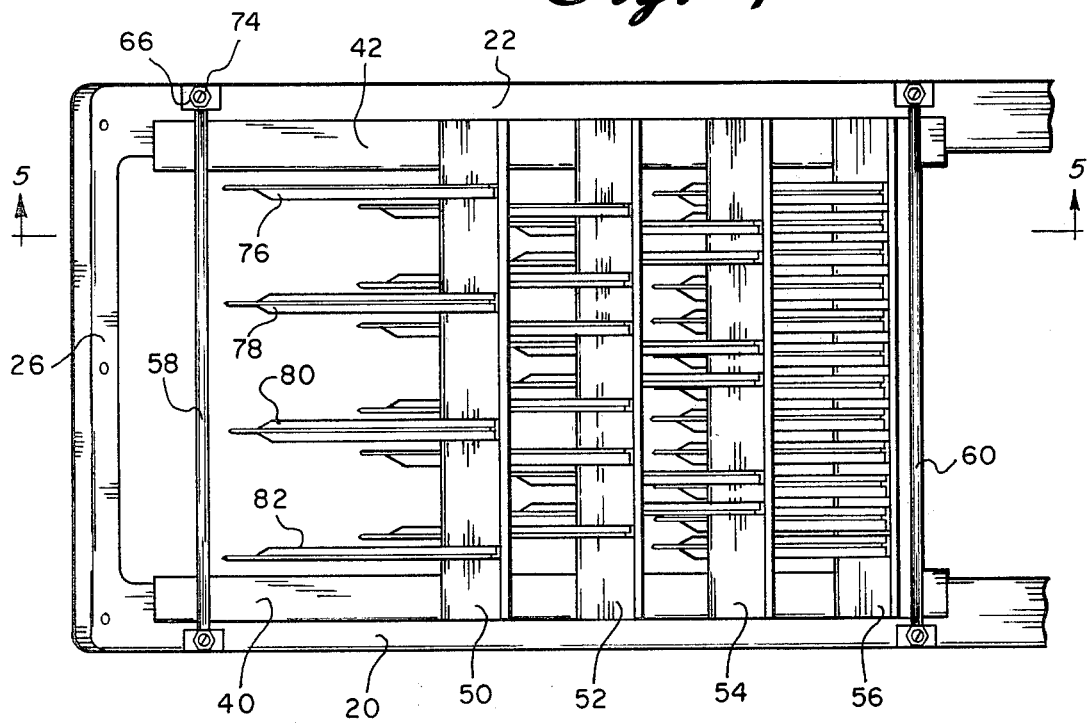
FIG. 4 is a top plan view of FIG. 3.

The horizontal portions 40 and 42 of the skids 36 and 38 are arranged so as to overlie the top of the runners 20 and 22, respectively, as is most clearly shown in FIGS. 3 and 4. The skids 36 and 38 merely rest on the runners 20 and 22 and are not secured directly thereto. They are, therefore, capable of moving vertically upwardly with respect to the runners.

In their lowest position, that is, when the portions 40 and 42 are resting on the runners 20 and 22, the lowermost edge of the vertical portions of the skids lie beneath the bottom of the runners 20 and 22. This is most clearly illustrated in FIG. 5 where it can be seen that the lower edge 46 of the vertical portion 44 of skid 38 lies well below the lower surface of the runner 22. It will be understood that the other skid 38 is similarly constructed and arranged. The forwardmost edge of the vertical portions of the skids are tapered as shown at 48.

Joining the skid members 36 and 38 together are horizontally disposed crossbars 50, 52, 54 and 56. Each of the crossbars is securely fastened to the horizontal portions 40 and 42 of the skids 36 and 38. Also secured to the skids 36 and 38 are forward cross rod 58 and rear cross rod 60. Each of the rods 58 and 60 is longer than the distance between the skids 36 and 38 so that the ends of the rods extend outwardly on each side thereof.

The ends of the rods 58 and 60 extend into the vertical opening in the guide posts 62, 64, 66 and 68 which are securely mounted on the runners 20 and 22. As shown most clearly in FIGS. 5 and 6, the left end of rod 58 is pushed downwardly by spring 70, the tension of which is adjusted by rotating screw 72 which is threaded through nut 74 secured to the top of the guide 66. While not specifically shown or described in detail, it should be understood that each of the other guide members 62, 64 and 68 are arranged and function in substantially the same manner as the guide members 66.

Secured to each of the crossbars 50, 52, 54 and 56 are a plurality of downwardly and forwardly extending teeth or tines. For example, the first row of tines secured to the crossbar 50 includes tines 76, 78, 80 and 82. While there are four such tines relatively widely spaced apart in the first row as shown in FIG. 4, the second row back has six such tines. These are arranged with a pair of tines spaced inwardly of the pair 76 and 78, a second pair of tines spaced inwardly between the pair 78 and 80 and a third pair spaced between the pair 80 and 82. A similar arrangement is shown on the third row mounted on crossbar 54. The last row of tines mounted on crossbar 56 is more populous and serves mainly as a collection device to move the collected clams or the shellfish into the bag located therebehind. In each row, the tines of that row parallel to each other.

Figure 5:
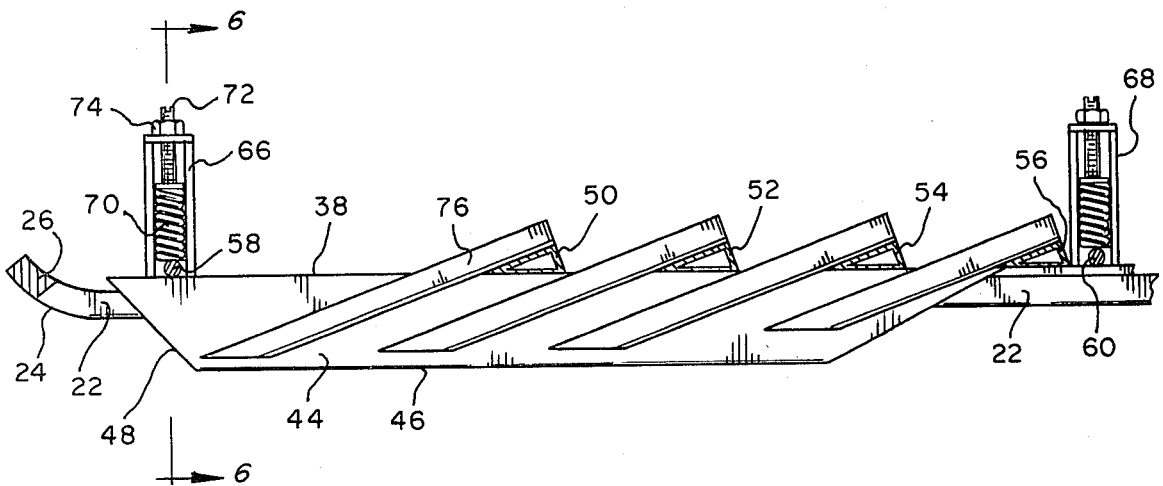
FIG. 5 is a cross-sectional view taken through the lines 5—5 of FIG. 4.
Figure 6:
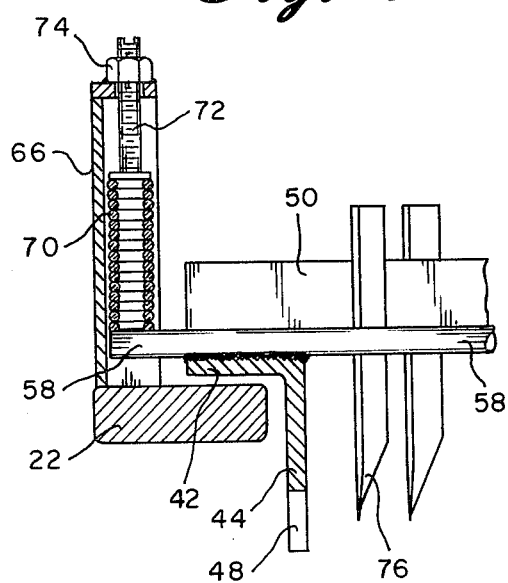
FIG. 6 is a cross-sectional view taken through the lines 6—6 of FIGS. 5.

As best shown in FIG. 5, all of the tines extend downwardly and forwardly at an acute angle of approximately 12 degrees from the top surface of the skids 36 and 38. Preferably, the first row of tiness are longer so that the lower portion of, for example, tine 78 is below the lower portion of the tines in the remaining rows. Also, the tines of the last row are preferably shorter. In all cases, however, none of the tines are long enough to fall below the lower edge 46 of the skid 38.

Figure 2:
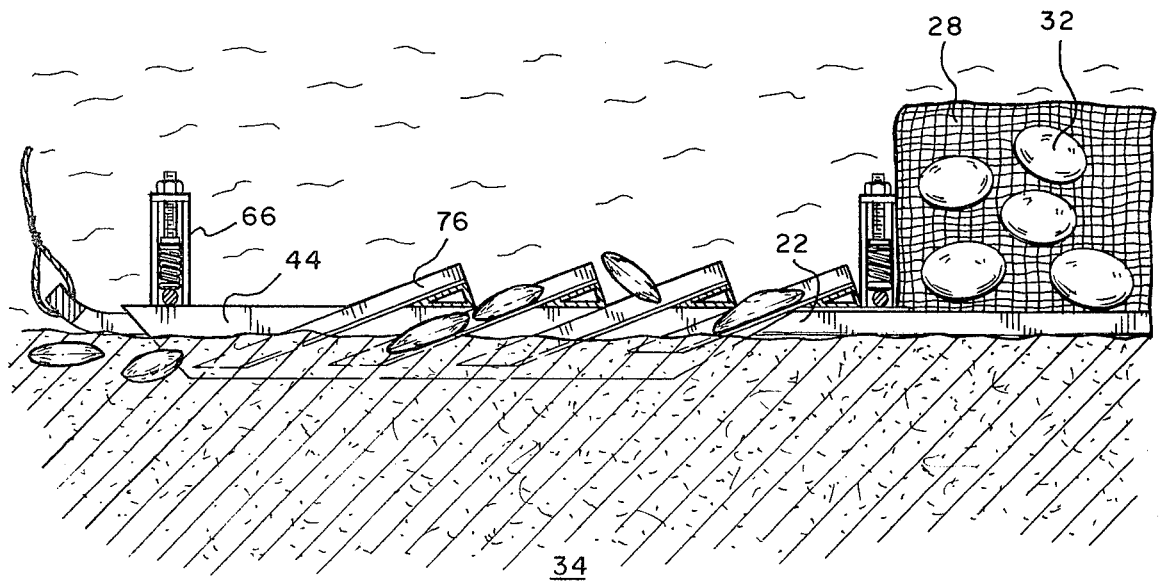
FIG. 2 is a cross-sectional view taken through the lines 2—2 of FIG. 1.

The dredge of the present invention works in the following manner. After it is dropped to the ocean floor, it is pulled by the towline 14. The runners 20 and 22 ride on the surface of the ocean floor while the vertical portions of the skids 36 and 38 cut into sand as shown in FIG. 2. The first row of tines, being longer than the others, primarily serve the function of loosening the compacted clam beds. Since there are a relatively few number of tines in the first row, this is accomplished relatively easily. Some clams will, however, be moved upwardly by the motion of the dredge over the tops of the first row of tines and onto the second row. At the same time, the second row of tines will pick up clams from the clam bed. As the dredge moves along, it has been found that the larger clams tend to be moved toward the middle of the dredge between the more closely spaced tines whereas the smaller clams tend to move outwardly into the larger spaces and back into the clam bed. Thus, the majority of clams which reach the last collecting row of tines are the larger clams which are then deposited into the bag 28.

Should the dredge approach an obstruction such as a rock or the like, the obstruction will first be engaged by the forward edge of one of the skids such as forward edge 48 of skid 38. Because of this tapered forward edge, the skid will be cammed upwardly over the obstruction. As the skid moves upwardly, it carries with it all of the crossbars and tines which are secured to the skids.

It should be readily apparent that the combination of the skids and runners protects the tines from damage due to the striking of obstructions such as rocks or the like. The skids provide a means for moving the tines up out of the way of any such obstructions. The skids alone, however, are not enough since the runners provide the function of preventing the skids and, the tines, from dredging too deeply.

While the preferred embodiment of the invention described above shows the use of four rows of tines, it should be readily apparent to those skilled in the art that many of the advantages of the invention can be attained utilizing two or three rows of tines or possibly even more than four rows. Furthermore, the number of tines in each row can be varied depending on the overall size of the dredge. In the preferred embodiment, the entire dredge 10 (exclusive of the bag 28) is comprised of metal. Preferably, the tines are comprised of angle iron. In some applications, however, it might be possible to substitute other suitable materials.

The present invention may be embodied in other specific forms without departing from the spirit or essential attributes thereof and accordingly, reference should be made to the appended claims rather than to the foregoing specification as indicating the scope of the invention.

I claim:

1. Apparatus for collecting shellfish and the like from the ocean floor comprising:
 a pair of elongated longitudinally extending parallel spaced apart runners;
 collection bag means mounted adjacent the rear of said runners for receiving and holding shellfish;

first and second parallel rows of tines carried by said runners, said rows extending between said runners and being substantially perpendicular thereto;

the tines in each row being substantially parallel to each other and extending downwardly and forwardly at an acute angle with respect to said runners;

substantially rigid frame means supporting said rows of tines, said frame means comprising a pair of spaced apart longitudinally extending skid members and a plurality of crossbars extending between said skid members, said tines being secured to said crossbars;

each of said skid members including a horizontal portion adapted to rest on a different one of said runners and a vertical portion adapted to extend downwardly beneath the bottom surface of said runners, the lowermost portion of said skid members being at a lower level than the lowermost part of any of said tines.

2. Apparatus as claimed in claim 1 wherein said first row of tines is adjacent the front of said runners and said second row is located just forward of said bag means and wherein the tines in said first row are longer than the tines in said second row.

3. Apparatus as claimed in claim 2 including a third parallel row of tines located between said first and second rows, each of said second and third rows having a greater number of tines therein than said first row.

4. Apparatus as claimed in claim 1 wherein said frame means and said runners are mounted together for limited vertical movement relative to each other, the forward ends of said skid members being tapered thereby forcing the frame means upwardly when said tapered ends encounter an obstruction.

5. Apparatus as claimed in claim 4 further including spring means for biasing said frame means and therefore said tines downwardly relative to said runners.

* * * * *